United States Patent
Bogner et al.

(10) Patent No.: US 6,649,946 B2
(45) Date of Patent: Nov. 18, 2003

(54) LIGHT SOURCE USING A YELLOW-TO-RED-EMITTING PHOSPHOR

(75) Inventors: Georg Bogner, Hainsacker (DE); Ir G. Botty, Venlo (NL); Bert Braune, Voelklingen (DE); Hubertus T. Hintzen, Eindhoven (NL); Jost W. H. van Krevel, Eindhoven (NL); Guenter Waitl, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 63 days.

(21) Appl. No.: 09/889,959

(22) PCT Filed: Nov. 30, 2000

(86) PCT No.: PCT/EP00/12046

§ 371 (c)(1),
(2), (4) Date: Jan. 22, 2002

(87) PCT Pub. No.: WO01/40403

PCT Pub. Date: Jun. 7, 2001

(65) Prior Publication Data

US 2003/0020101 A1 Jan. 30, 2003

(30) Foreign Application Priority Data

Nov. 30, 1999 (EP) .............................................. 99123747

(51) Int. Cl.$^7$ ............................................. H01L 27/148
(52) U.S. Cl. .......................... 257/233; 257/233; 257/98
(58) Field of Search .......................... 257/233, 89, 99, 257/98, 100, 88; 106/481; 501/5

(56) References Cited

U.S. PATENT DOCUMENTS

| | | | |
|---|---|---|---|
| 6,252,254 B1 | 6/2001 | Soules et al. | 257/89 |
| 6,255,670 B1 | 7/2001 | Srivastava et al. | 257/89 |
| 6,287,993 B1 | 9/2001 | Fu et al. | 501/5 |

OTHER PUBLICATIONS

US patent application publication US 2003/0024438 A1 by Botty et al. pub date Feb. 6, 2003.
Soon–Seok Lee et al: "Development and luminescent characteristics of CaSiN/sub 2/ based phosphors", Journal of the Institute of Electronics Engineers of Korea D, Oct. 1999, Inst. Electron. Eng. Korea, South Korea, vol. 36–D, No. 10, pp. 31–36, XP002136109, ISSN: 1226–5845, p. 31.

*Primary Examiner*—David Nelms
*Assistant Examiner*—Thinh T. Nguyen
(74) *Attorney, Agent, or Firm*—Cohen, Pontani, Lieberman & Pavane

(57) ABSTRACT

A light source uses a yellow to red emitting phosphor with a host lattice of the nitridosilicate type $M_xSi_yN_z$:Eu, wherein M is at least one of an alkaline earth metal chosen from the group Ca, Sr, Ba and wherein $z=2/3x+4/3y$.

10 Claims, 8 Drawing Sheets

LIGHT SOURCE USING A YELLOW-TO-RED-EMITTING PHOSPHOR

This application is a U.S. National Phase Application under 35 USC 371 of International Application No. PCT/EP00/12046 filed Nov. 30, 2000 (published in English).

TECHNICAL FIELD

This invention relates to an electrical Light source using a yellow-to-red-emitting phosphor and more particularly, but not exclusively to Light Emitting Diodes (LED). The phosphor belongs to the class of rare-earth activated silicon nitrides. Other application fields are electrical lamps, especially high intensity discharge lamps or fluorescent lamps.

BACKGROUND ART

For $Eu^{2+}$-doped material normally UV-blue emission is observed (Blasse and Grabmeier: Luminescent Materials, Springer Verlag, Heidelberg, 1994). Several studies show that also emission in the green and yellow part of the visible spectrum is possible (Blasse: Special Cases of divalent lanthanide emission, Eur. J. Solid State Inorg. Chem. 33 (1996), p. 175; Poort, Blokpoel and Blasse: Luminescence of $Eu^{2+}$ in Barium and Strontium Aluminate and Gallate, Chem. Mater. 7 (1995), p. 1547; Poort, Reijnhoudt, van der Kuip, and Blasse: Luminescence of $Eu^{2+}$ in Silicate host lattices with Alkaline earth ions in a row, J. Alloys and Comp. 241 (1996), p. 75). Hitherto, red $Eu^{2+}$ luminescence is observed only in some exceptional cases, such as in alkaline earth sulphides and related lattices of the rock-salt type (Nakao, Luminescence centers of MgS, CaS and CaSe Phosphors Activated with $Eu^{2+}$ Ion, J. Phys. Soc. Jpn. 48(1980), p. 534), in alkaline earth thiogallates (Davolos, Garcia, Fouassier, and Hagenmuller, Luminescence of $Eu^{2+}$ in Strontium and Barium Thiogallates, J. Solid. State Chem. 83 (1989), p. 316) and in some borates (Diaz and Keszler; Red, Green, and Blue $Eu^{2+}$ luminescence in solid state Borates: a structure-property relationship, Mater. Res. Bull. 31 (1996), p. 147). $Eu^{2+}$ luminescence in alkaline-earth silicon nitrides has hitherto only been reported for $MgSiN_2$:Eu (Gaido, Dubrovskii, and Zykov: Photoluminescence of $MgSiN_2$ Activated by Europium, Izv. Akad. Nauk SSSR, Neorg. Mater. 10 (1974), p. 564; Dubrovskii, Zykov and Chernovets: Luminescence of rare earth Activated $MgSiN_2$, Izv. Akad. Nauk SSSR, Neorg. Mater. 17 (1981), p. 1421) and $Mg_{1-x}Zn_xSiN_2$:Eu (Lim, Lee, Chang: Photoluminescence Characterization of $Mg_{1-x}Zn_xSiN_2$:Tb for Thin Film Electroluminescent Devices Application, Inorganic and Organic Electroluminescence, Berlin, Wissenschaft und Technik Verlag, (1996), p. 363). For both $Eu^{2+}$ luminescence in the green and green/blue part of the spectrum was found.

New host lattices of the nitridosilicate type are based on a three dimensional network of cross-linked $SiN_4$ tetrahedra in which alkaline earth ions (M=Ca, Sr and Ba) are incorporated. Such lattices are for example $Ca_2Si_5N_8$ (Schlieper and Schlick: Nitridosilicate I, Hochtemperatursynthese und Kristallstruktur von $Ca_2Si_5N_8$, Z. anorg. allg. Chem. 621, (1995), p. 1037), $Sr_2Si_5N_8$ and $Ba_2Si_5N_8$ (Schlieper, Millus and Schlick: Nitridosilicate II, Hochtemperatursynthesen und Kristallstrukturen von $Sr_2Si_5N_8$ and $Ba_2Si_5N_8$, Z. anorg. allg. Chem. 621, (1995), p. 1380), and $BaSi_7N_{10}$ (Huppertz and Schnick: Edge-Sharing $SiN_4$ tetrahedra in the highly condensed Nitridosilicate $BaSi_7N_{10}$, Chem. Eur. J. 3 (1997), p. 249). The lattice types are mentioned in Table 1.

Sulfide based phosphors (e.g. earth alkaline sulfides) are less desirable for lighting applications, especially for LED applications, because they interact with the encapsulating resin system, and partially suffer from hydrolytic attack. Red emitting $Eu^{2+}$ activated borates show already temperature quenching to a certain degree at the operating temperature of LEDs.

DISCLOSURE OF THE INVENTION

It is, therefore, an object of this invention to obviate the disadvantages of the prior art. It is another object of the invention to provide a light source with improved red color rendition R9. It is a further object to provide a light source with an improved overall color rendition Ra. It is a further object to provide a white LED with high color rendition.

Especially high stability up to at least 100° C. is desirable for LED applications. Their typical operation temperature is around 80° C.

These objects are accomplished by the characterising features of claim 1. Advantageous embodiments can be found in the dependant claims.

The light source uses a new yellowish-red emitting phosphor. Its absorption is at least within the blue to green spectral region. Furthermore they show fluorescent emission under absorption. Those $Eu^{2+}$-doped luminescent materials show emission within the yellow to red spectral region, especially long wavelength red, orange or yellow emission. These phosphors are based on alkaline-earth silicon nitride material as host-lattices. They are very promising, especially for LED applications, when used as phosphors. Hitherto white LEDs were realised by combining a blue emitting diode with a yellow emitting phosphor. Such a combination has only a poor colour rendition. A far better performance can be achieved by using a multicolor (for example red-green-blue) system. Typically the new material can be used together with a green-emitting (or yellow-emitting) phosphor, for example strontiumaluminate $SrAl_2O_4$:$Eu^{2+}$, whose emission maximum is around 520 nm.

In detail, the new Light source using a yellow-to-red-emitting phosphor, uses a host lattice of the nitridosilicate type $M_xSi_yN_z$:Eu, wherein M is at least one of an alkaline earth metal chosen from the group Ca, Sr, Ba and wherein $z=2/3x+4/3y$. The incorporation of nitrogen increases the proportion of covalent bond and ligand-field splitting. As a consequence this leads to a pronounced shift of excitation and emission bands to longer wavelengths in comparison to oxide lattices.

Preferably, the phosphor is of the type, wherein x=2, and y=5. In another preferred embodiment, the phosphor is of the type, wherein x=1, and y=7.

Preferably, the metal M in the phosphor is strontium because the resulting phosphor is emitting at relatively short yellow to red wavelengths. Thus the efficiency is rather high in comparison to most of the other elected metals M.

In a further embodiment the phosphor uses a mixture of different metals, for example Ca (10 atom.-%) together with Ba (balance), as component M.

These materials show high absorption and good excitation in the UV and blue visible spectrum (up to more than 450 nm), high quantum efficiency and low temperature quenching up to 100° C.

It can be used for luminescence conversion LEDs with a blue light emitting primary source together with one or more phosphors (red and green). Another field of application are compact fluorescent lamps and replacement of yttrium vanadate in high intensity discharge lamps.

DETAILED EMBODIMENTS $Eu_2O_3$ (with purity 99,99%), or Eu metal (99,99%), Ba metal (>99%); Sr metal (99%), $Ca_3N_2$ (98%), or Ca powder (99,5%) and $Si_3N_4$ (99,9%) were used as commercially available starting materials. Ba and Sr were nitrided by firing at 550 and 800° C. under a nitrogen atmosphere. Subsequently, $Ca_3N_2$ or nitrided Ba, Ca or Sr were ground in a mortar and stoichiometrically mixed with $Si_3N_4$ under nitrogen atmosphere. The Eu-concentration was 10 atom.-% compared to the alkaline earth ion. The powdered mixture was fired in molybdenum crucibles at about 1300–1400° C. in a horizontal tube furnace under nitrogen/hydrogen atmosphere. After firing, the powders were characterised by powder X-ray diffraction (Cu, Kα-line), which showed that all compounds had formed.

Figure 1:
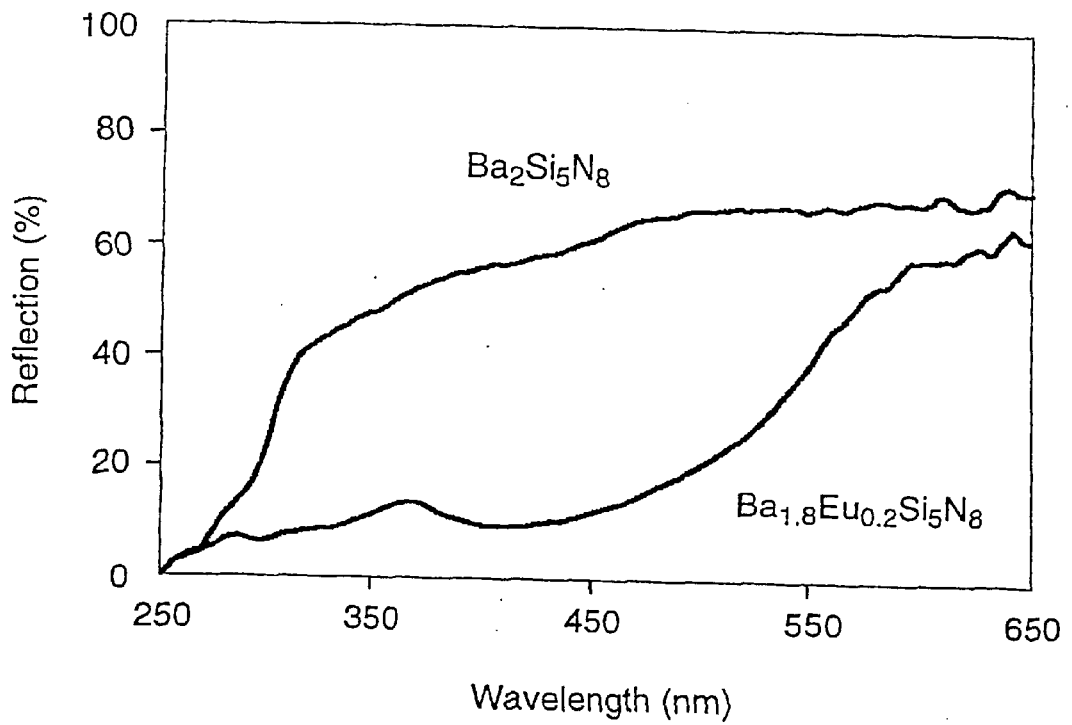
FIG. 1: Diffuse reflection spectra of undoped $Ba_2Si_5N_8$ and $Ba_2Si_5N_8$:Eu.
Figure 2:
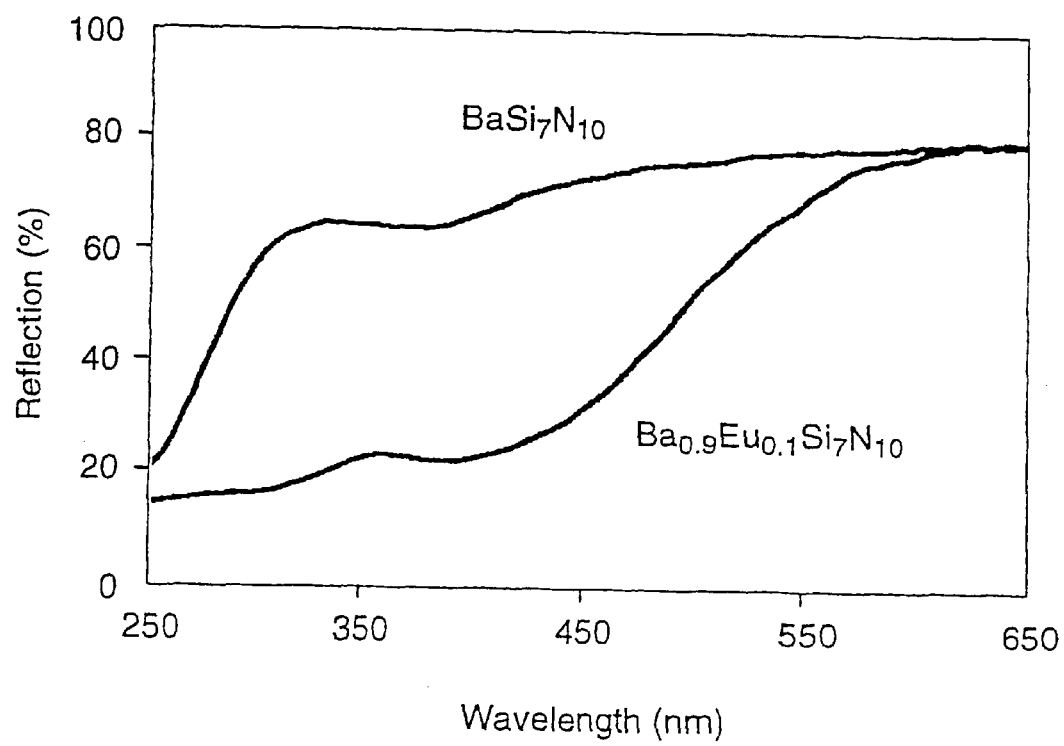
FIG. 2: Diffuse reflection spectra of undoped $BaSi_7N_{10}$ and $BaSi_7N_{10}$:Eu.

The undoped $Ba_2Si_5N_8$, $Ca_2Si_5N_8$ and $BaSi_7N_{10}$ are greyish-white powders. These undoped rare-earth activated silicon nitrides show high reflection in the visible range (400–650 nm) and a strong drop in the reflection between 250–300 nm (FIGS. 1 and 2). The drop in reflectance is ascribed to host-lattice absorption. The Eu-doped samples are orange-red, except for $BaSi_7N_{10}$:Eu which is orange-yellow (Table 1). The strong coloration is unique for $Eu^{2+}$-doped rare-earth activated silicon nitrides and make these material interesting orange-red phosphors. A typical example of a reflection spectrum of $Ba_2Si_5N_8$:Eu shows that the absorption due to Eu is superposed on the host-lattice absorption and extends up to 500–550 nm (FIG. 1). This explains the red-orange colour of these compounds. Similar reflection spectra were observed for $Sr_2Si_5N_8$:Eu and $Ca_2Si_5N_8$:Eu.

For $BaSi_7N_{10}$:Eu the absorption of Eu is less far in the visible part (FIG. 2), which explains the orange-yellow colour of this compound.

Figure 3:
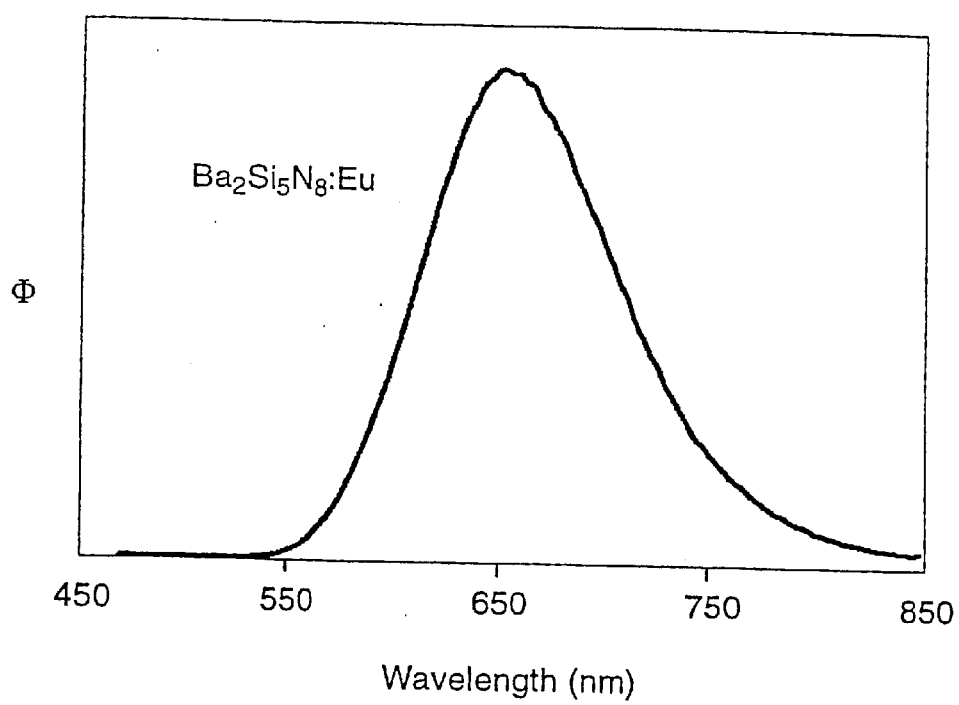
FIG. 3: Emission spectrum of $Ba_2Si^5N^8$:Eu.
Figure 4:
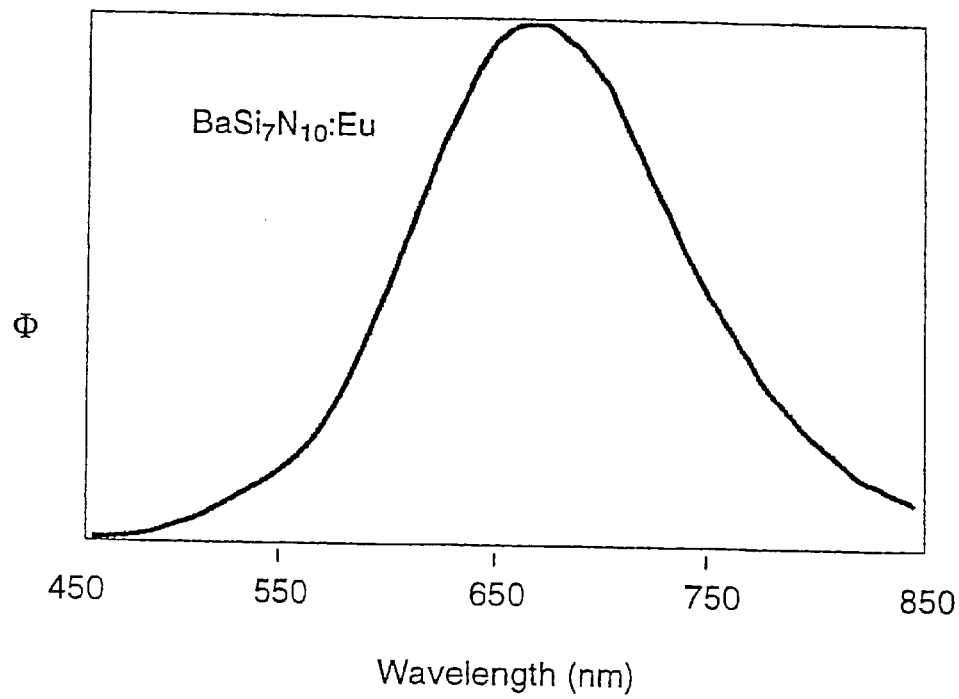
FIG. 4: Emission spectrum of $BaSi_7N_{10}$:Eu.

All samples show efficient luminescence under UV excitation with emission maxima in the orange-red part of the visible spectrum (see Table 1). Two typical examples of emission spectra can be seen in FIGS. 3 and 4. They show that the emission is at extremely long wavelengths (for $Eu^{2+}$ emission) with maxima up to 660 nm for $BaSi_7N_{10}$:Eu (FIG. 4.). Excitation bands are observed at low energy which is the result of a centre of gravity of the $Eu^{2+}$ 5d band at low energy and a strong ligand-field splitting of the $Eu^{2+}$ 5d band, as can be expected for $N^{3-}$ containing lattices (van Krevel, Hintzen, Metselaar, and Meijerink: Long Wavelength $Ce^{3+}$-luminescence in Y—Si—O—N Materials, J. Alloys and Comp. 168 (1998) 272).

Since these materials can convert blue into red light due to low-energy excitation bands, they can be applied in white light sources, for example based on primarily blue-emitting LED's (typically GaN or InGaN) combined with red, yellow and/or green emitting phosphors.

TABLE 1

| Compound | Crystal structure | Color | Emission Maximum (nm)* |
|---|---|---|---|
| $Ca_2Si_5N_8$:Eu | Monoclinic | Orange-Red | 600 to 630 |
| $Sr_2Si_5N_8$:Eu | Orthorhombic | Orange-Red | 610 to 650 |
| $Ba_2Si_5N_8$:Eu | Orthorhombic | Orange-Red | 620 to 660 |
| $BaSi_7N_{10}$:Eu | Monoclinic | Orange-Yellow | 640 to 680 |

Figure 5:
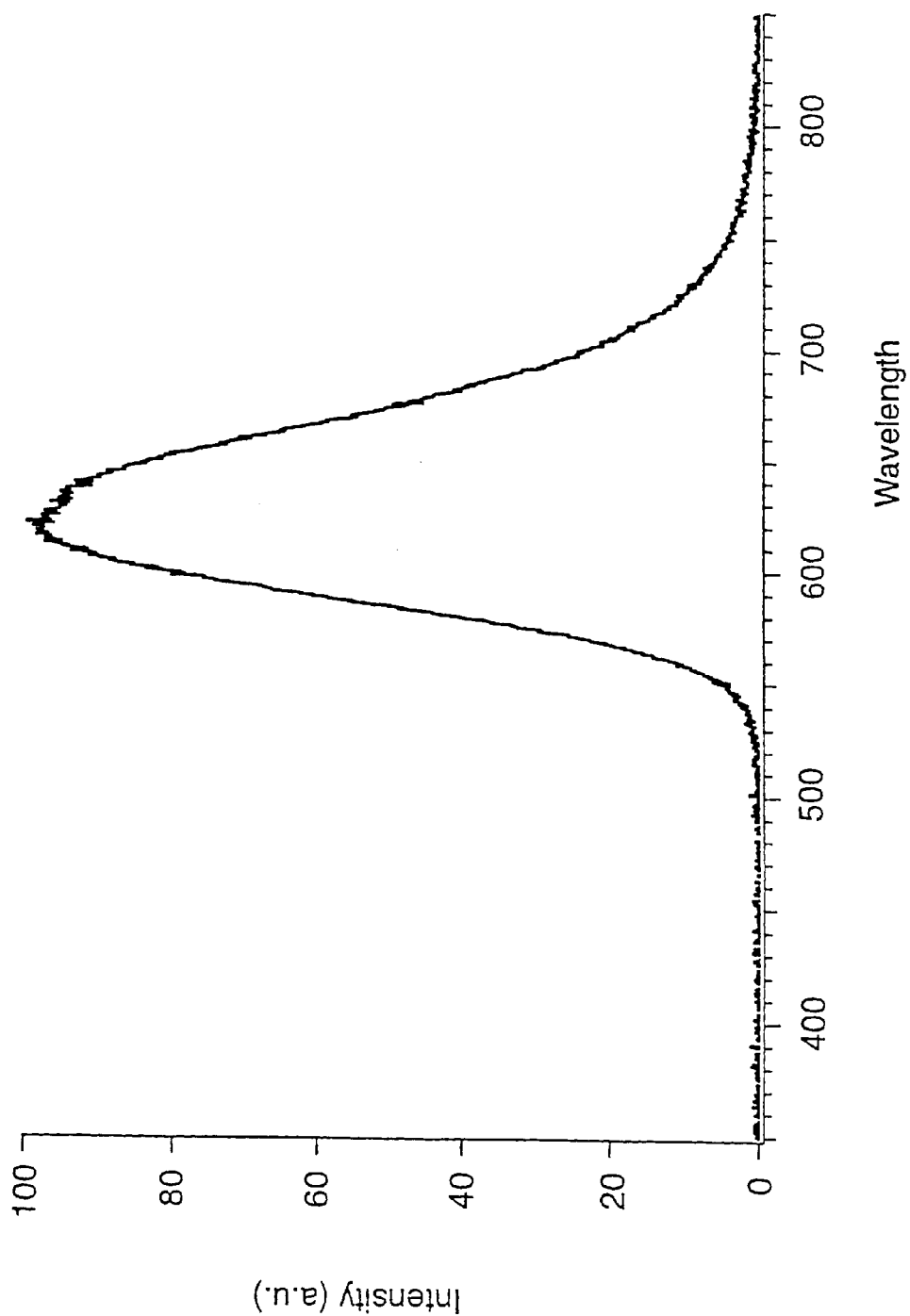
FIGS. 5–7: Emission spectrum of several embodiments of $Sr_2Si_5N_8$:Eu.

*depending on the conditions for preparation and concentration of the activator; typical values for Eu-concentration may vary between 1 and 10% compared to the alkaline-earth ion M These emission maxima are unusually far in the long wavelength side. A specific example is a phosphor of the type $Sr_{1.8}Eu_{0.2}Si_5N_8$. Its emission spectrum is shown in FIG. 5.

Another embodiment for realising M is the use of Zn. It can replace Ba, Sr or Ca fully or partially.

A further embodiment for replacing Si fully or partially is Ge. An concrete embodiment is $Sr_{1.8}Eu_{0.2}Ge_5N_8$.

Some further specific examples were investigated.

The preparation conditions and optical properties of the red emitting phosphor $Sr_2Si_5N_8$:$Eu^{2+}$ were investigated. Optimisation showed a quantum efficiency of about 70%. The emission is tuneable between 610 and 650 nm, depending on the $Eu^{2+}$ concentration in the sample and the heating conditions. The absorption at 400 nm and 460 nm is high (reflection of only 15–40%) and the temperature quenching of the luminescence at 80° C. is low (only 4%). The particle size of the phosphor is without milling below 5 μm. These properties make this phosphor very interesting especially for application in both the UV and blue LED.

For the nitride synthesis, the starting materials are $Si_3N_4$ (99,9% (mainly α-phase), Alfa Aesar), Sr metal (dendritic pieces 99,9%, Alfa Aesar) and $Eu_2O_3$ (4N). The Sr metal has to be nitrided and in case one uses instead of $Eu_2O_3$ Eu metal, this has also to be nitrided.

The Sr metal is milled by hand in an agath mortar in an argon glovebox and nitrided at 800° C. under $N_2$. This results in a nitration over 80%.

After remilling, the nitrided metal, together with $Si_3N_4$ and $Eu_2O_3$, is milled and mixed by hand again in the glovebox. The heating of this mixture has typically the following parameters:
18° C./min to 800° C.
5h at 800° C.
18° C./min to $T_{end}$ (1300–1575° C.)
5 h at $T_{end}$ (1300–1575° C.)
$H_2(3.75\%)/N_2$ 400l/h
$Ca_2Si_5N_8$:$Eu^{2+}$ samples were made with $Ca_3N_2$ as starting material.

An overview of all the samples is given in table 1. Typically, the samples were first heated at 800° C., and then they were heated a second time in the same cycle at elevated (1300–1600° C.) temperatures. The samples were then milled (mill under air), sieved and measured.

TABLE 1 parameters of heating cycles of $(Ca,Sr)_2Si_5N_8$:$Eu^{2+}$ samples

| Code | Ca/Sr | $Eu^{2+}$ (%) | Time 1 (h) | Temp. 1 (° C.) | Time 2 (h) | Temp. 2 (° C.) |
|---|---|---|---|---|---|---|
| EC/HU 31/00 | Ca | 10 | 5 | 800 | 5 | 1400 |
| EC/HU 42/00 | Ca | 1 | 5 | 800 | 5 | 1565 |

TABLE 1-continued parameters of heating cycles of (Ca,Sr)$_2$Si$_5$N$_8$:Eu$^{2+}$ samples

| Code | Ca/Sr | Eu$^{2+}$ (%) | Time 1 (h) | Temp. 1 (° C.) | Time 2 (h) | Temp. 2 (° C.) |
|---|---|---|---|---|---|---|
| EC/HU 41/00 | Ca0.4Sr1.4 | 10 | 5 | 800 | 5 | 1565 |
| EC/HU 62/00 | Sr | 1 | 5 | 800 | 5 | 1400 |
| EC/HU 63/00 | Sr | 2 | 5 | 800 | 5 | 1400 |
| EC/HU 64/00 | Sr | 3 | 5 | 800 | 5 | 1400 |
| EC/HU 65/00 | Sr | 5 | 5 | 800 | 5 | 1400 |
| EC/HU 66/00 | Sr | 8 | 5 | 800 | 5 | 1400 |
| EC/HU 67/00 | Sr | 10 | 5 | 800 | 5 | 1400 |

The samples that are obtained after this heating show a color of deep orange for 10% Eu$^{2+}$ containing Sr$_2$Si$_5$N$_8$ samples. With less Eu$^{2+}$ the colour is fainter. The Ca samples have a yellow-orange colour.

There is also another interesting feature: the powder particles are very small with an average particle size d$_{50}$ between about 0,5 and 5 µm, a typically value is d$_{50}$=1.3 µm. The small particle sizes are advantageous for the processing of LEDs with luminescent material. For example they allow a homogeneous distribution in the resin.

TABLE 2

Optical data of (Ca,Sr)$_2$Si$_5$N$_8$:Eu$^{2+}$ samples

| Code | Ca/Sr | Eu$^{2+}$ (%) | Em. Max (nm) | Refl. 400 (%) | Refl. 460 (%) | QE (%) | x | y |
|---|---|---|---|---|---|---|---|---|
| EC/HU 31/00 | Ca | 10 | 619 | 12 | 19 | 26 | 0.600 | 0.396 |
| EC/HU 42/00 | Ca | 1 | 603 | 47 | 58 | 37 | 0.555 | 0.435 |
| EC/HU 41/00 | Ca0.4 Sr1.4 | 10 | 660 | 17 | 22 | 59 | 0.636 | 0.,354 |
| EC/HU 62/00 | Sr | 1 | 609 | 53 | 58 | 70 | 0.602 | 0.393 |
| EC/HU 63/00 | Sr | 2 | 618 | 43 | 48 | 73 | 0.615 | 0.381 |
| EC/HU 64/00 | Sr | 3 | 621 | 36 | 41 | 72 | 0.622 | 0.374 |
| EC/HU 65/00 | Sr | 5 | 624 | 26 | 32 | 67 | 0.632 | 0.365 |
| EC/HU 66/00 | Sr | 8 | 636 | 21 | 26 | 67 | 0.641 | 0.356 |
| EC/HU 67/00 | Sr | 10 | 644 | 17 | 22 | 64 | 0.642 | 0.354 |

Concerning table 2 all samples were typically first heated in a first cycle (for example 800° C. for 5 h), as already outlined above.

Included in table 2 are the position of the emission maximum, the mean wavelength, the reflection at 400 and 460 nm, the quantum efficiency and finally the x and y colour coordinates.

From table 2 it can be derived that the pure Ca samples are not as favourable as the Sr samples. It is surprising that the Sr—Ca compound has an emission wavelength that is larger than that of the pure Sr compound.

Figure 6:
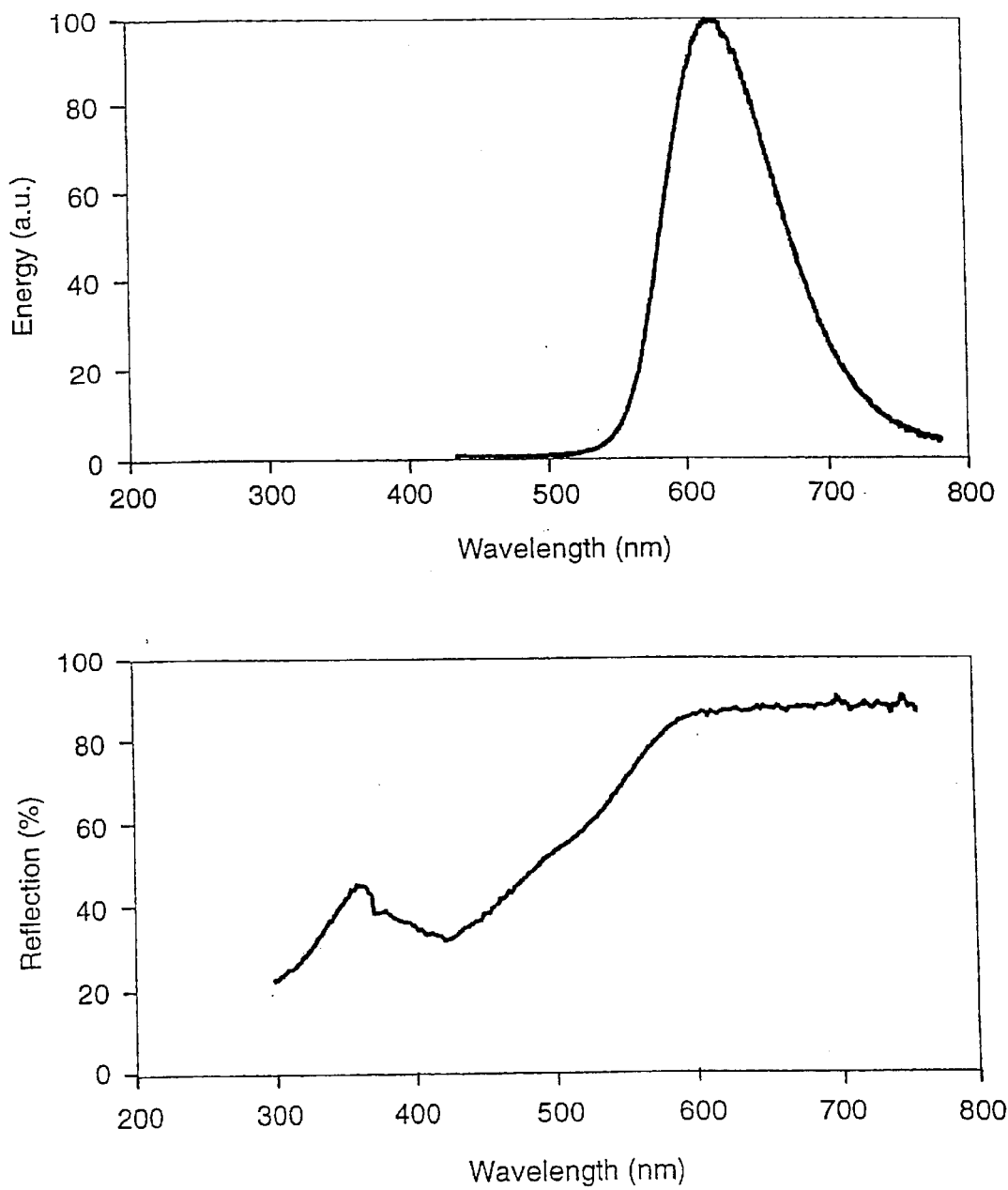
Figure 7:
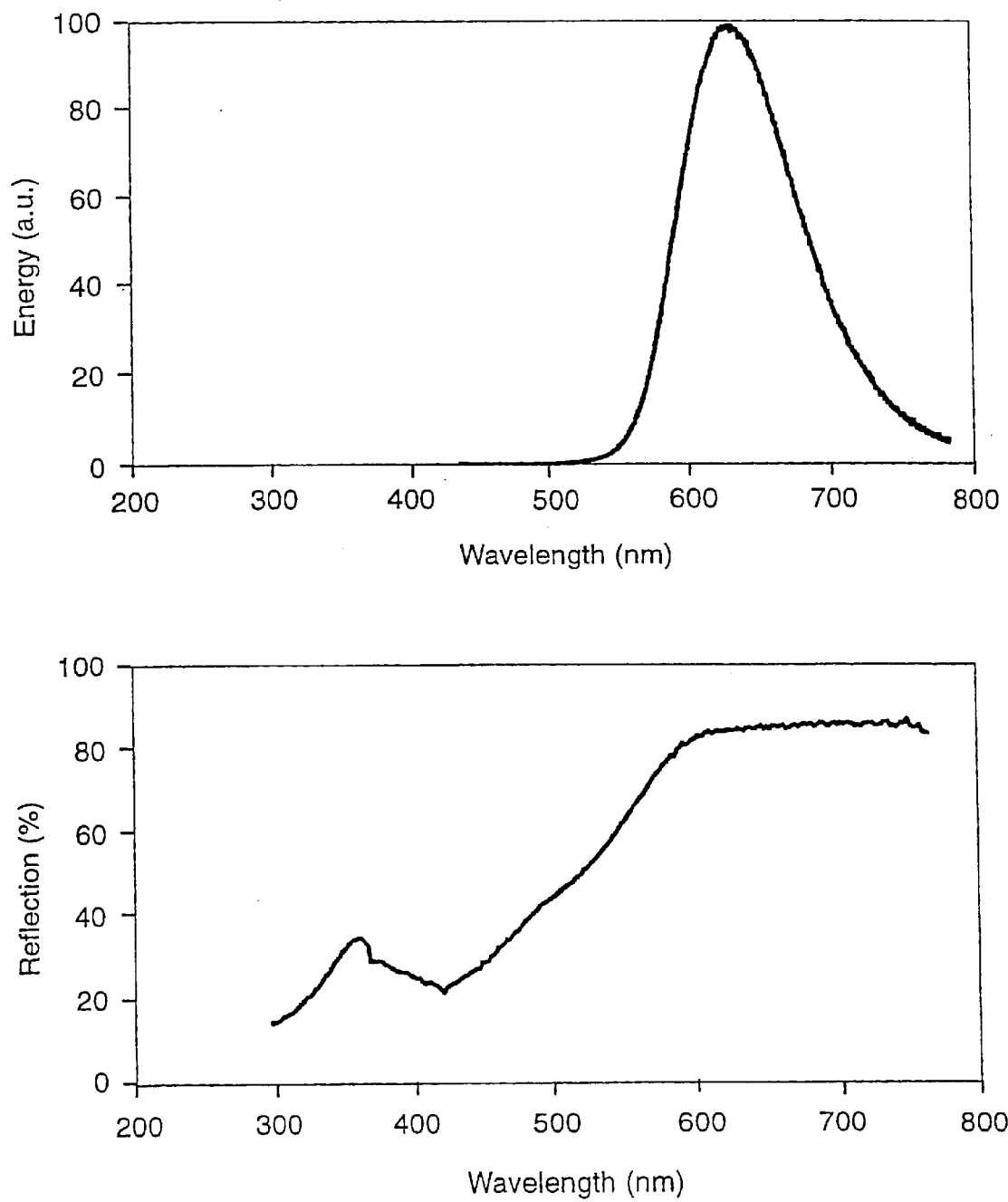
Figure 8:
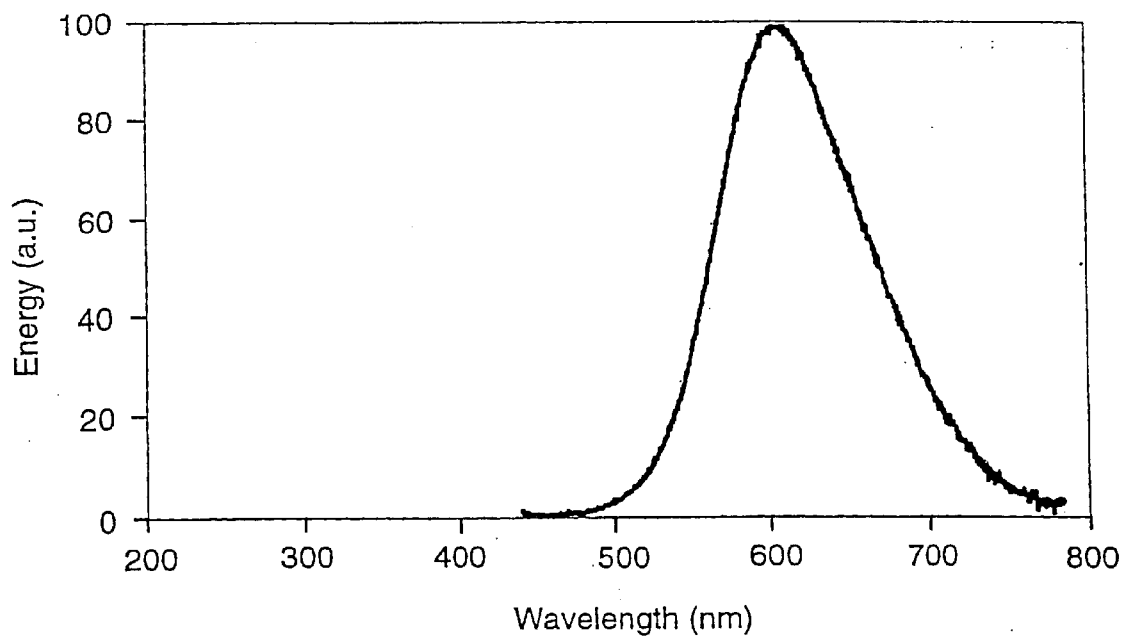
FIG. 8: Emission spectrum of $Ca_2Si_5N_8$:Eu.
Figure 8:
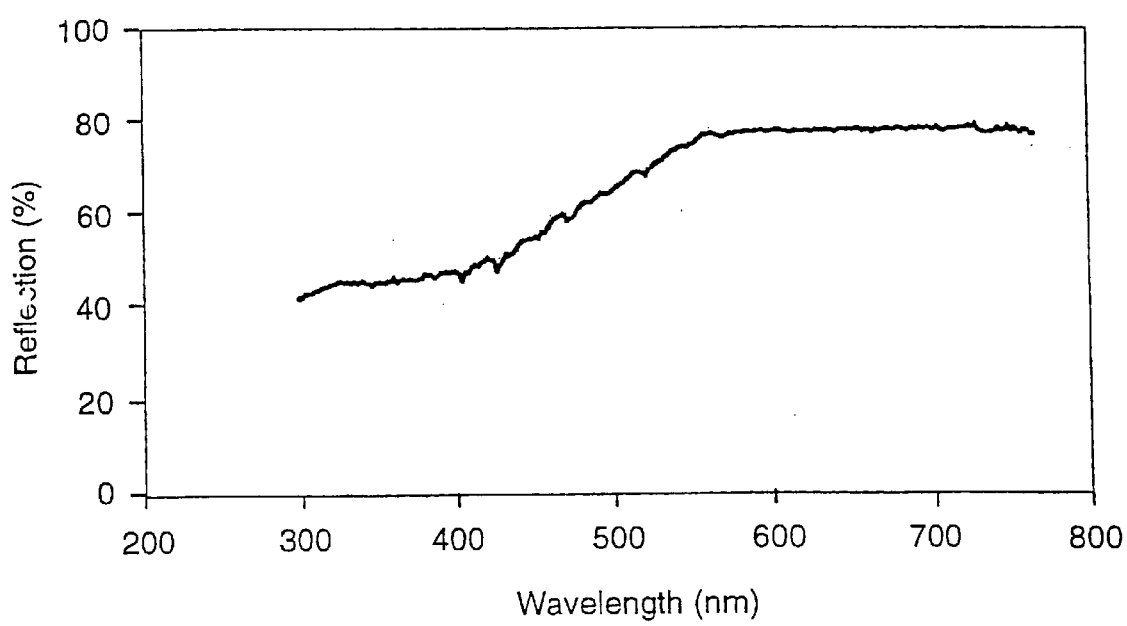

Specific examples are shown in FIGS. 6 to 8. FIG. 6 shows the energy distribution (in arbitrary units) and reflection (in percent) of sample HU 64/00 (Sr$_2$Si$_5$N$_8$:Eu$^{2+}$) having a proportion of 3% Eu and a quantum efficiency of 72%. FIG. 7 shows the energy distribution (in arbitrary units) and reflection (in percent) of sample HU 65/00 (Sr$_2$Si$_5$N$_8$:Eu$^{2+}$) having a proportion of 5% Eu and a quantum efficiency of 67%. FIG. 8 shows the energy distribution (in arbitrary units) and reflection (in percent) of sample HU 42/00 (Ca$_2$Si$_5$N$_8$:Eu$^{2+}$) having a proportion of 1% Eu and a quantum efficiency of 37%.

A specific example of a light source is a white LED whose principle is well-known, see for example U.S. Pat. No. 5,998,925 or U.S. Pat. No. 6,066,861. It uses a blue emitting primary light source (peak emission around 380 to 470 nm), preferably a (In)GaN-chip whose radiation is partially absorbed by a conversion material based on a resin and at least one phosphor. Improved color rendition can be obtained for a white LED using two or three conversion phosphors for a blue light of the primary light source. Embodiments may contain first phosphors with main emission in the range 480 to 600 nm, for example yttrium based garnets, thiogallates and/or chlorosilicates together with second phosphors of the inventive new type rare-earth activated silicon nitrides having a main emission above 600 nm and preferably above 650 nm. Some overlap between the emission of the different phosphors may exist between 600 and 650 nm. Especially by using a white LED based on primary emission between 420 and 470 nm (peak wavelength) together with a first phosphor YAG:Ce (yellow) and a second phosphor M$_2$Si$_5$N$_8$:Eu$^{2+}$ (red) a color rendition Ra up to 85 and even around 90 was obtained, depending of details of the mixture and choice of M.

Even further improving is obtained by first phosphors with more greenish emission (maximum around 490 nm).

Another concept is a UV-radiation emitting primary light source for exciting three phosphors (RGB-concept), wherein the Red component is a phosphor of the inventive new type rare-earth activated silicon nitrides and the Green and Blue component are well known phosphors as outlined above.

Besides, the inventive new phosphor can be used to create a highly stable red or orange or yellow emitting LED which may be based on a primary light source (preferably InGaN-Chip) of peak emission around 380 to 480 nm whose light is fully converted by a nitride phosphor of the inventive type rare-earth activated silicon nitrides doped with Eu. These LEDs show higher efficiency and improved stability compared to well-known commercial LEDs with direct excitation of yellow to red colors.

Figure 9:
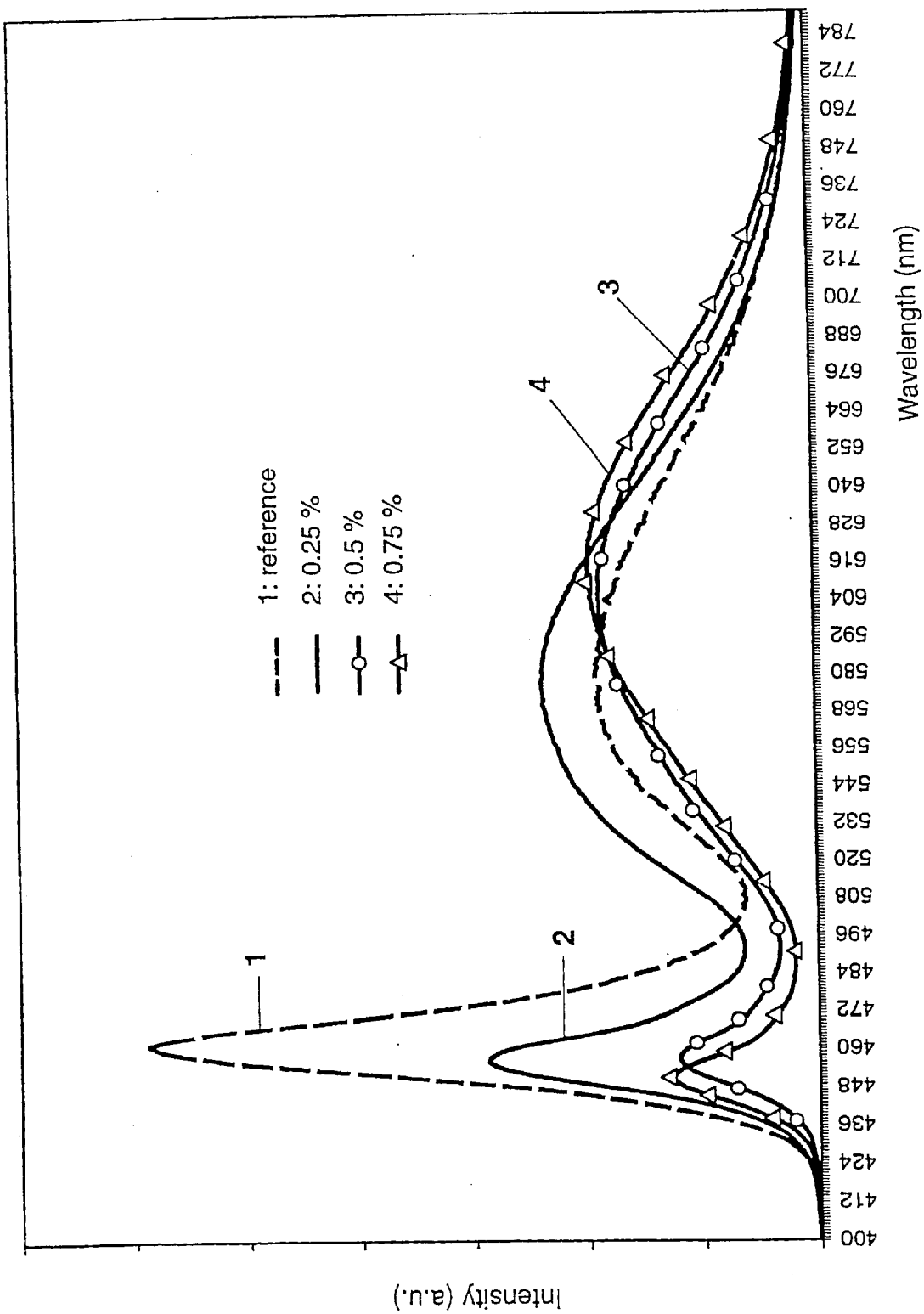
FIG. 9: Emission spectra of a white LEDs.

FIG. 9 shows the spectral emission of several white LEDs. They are based on an InGaN-Chip emitting primary radiation with a peak emission wavelength of 460 nm which is partially converted within an epoxy resin covering the chip.

Figure 10:
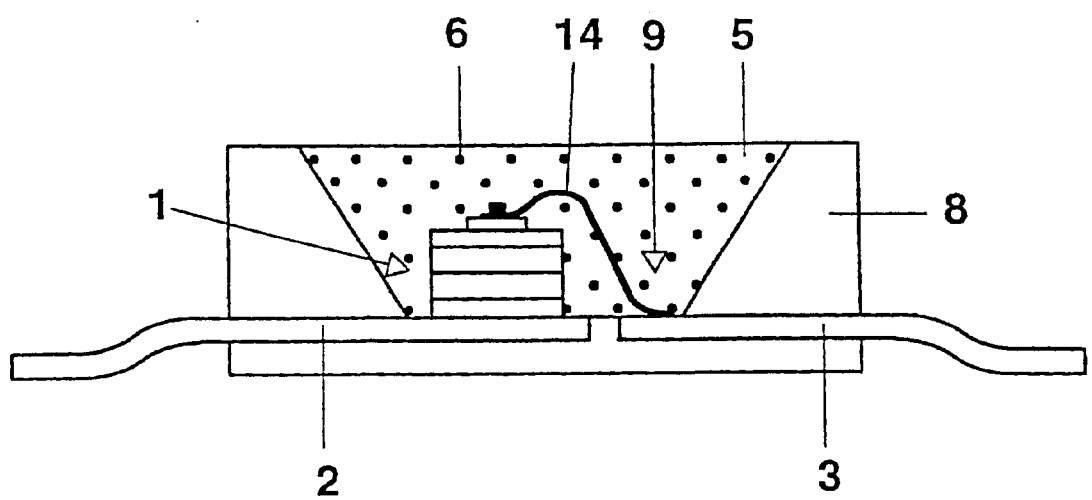
FIG. 10: shows a semiconductor element which serves as light source for white light.

The schematic construction of a light source for white light is explicitly shown in FIG. 10. The light source is a semiconductor element (chip 1) of the type InGaN having a peak emission wavelength of 460 nm and a first and a second electrical terminal 2, 3 including a bonding wire 14, the semiconductor element being embedded in the region of a recess 9 within a basic housing 8, which is not transmissive for light. The frontier between housing 8 and recess 9 is a wall which serves as a reflector for the blue primary radiation emitted from chip 1. The recess 9 is filled with a potting mass 5 which comprises as main constituents an epoxy casting resin and phosphor pigments 6 (less than 15% by weight of the mass 5). Further small amounts are provided, among others, by methyl ether and aerosil.

The resin of several embodiments comprises different phosphor compositions. In detail, a reference is given by a standard white LED based on conversion of the primary emitted blue light only by YAG:Ce phosphor. Its proportion is 3,6 weight-% of the resin (curve 1). Three embodiments comprising Sr$_2$Si$_5$N$_8$:Eu$^{2+}$ in addition to YAG:Ce were investigated. Keeping the whole proportion of conversion phosphors constant (3,6%), an amount of 0,25% YAG:Ce was replaced by $Sr_2Si_5N_8:Eu^{2+}$, see curve 2. This amount of $Sr_2Si_5N_8:Eu^{2+}$ was further increased to 0,5% (curve 3) and to 0,75% (curve 4). Their color rendition Ra was markedly improved by 6% (curve 2), 10% (curve 3), and 12% (curve 4) relative to the reference (curve 1).

What is claimed is:

1. Light source using a yellow-to-red-emitting phosphor, wherein the phosphor converts at least partially radiation of a primary light source, characterised in that said phosphor has a host lattice of the nitridosilicate type $M_xSi_yN_z:Eu$, wherein M is at least one of an alkaline earth metal chosen from the group Ca, Sr, Ba, Zn and wherein $z=\frac{2}{3}x+\frac{4}{3}y$.

2. Light source according to claim 1, wherein x=2, and y=5.

3. Light source according to claim 1, wherein x=1, and y=7.

4. Light source according to claim 1, wherein M is strontium.

5. Light source according to claim 1, wherein M is a mixture of at least two metals of said group.

6. Light source according to claim 1, wherein Si is replaced fully or partially by Ge.

7. Light source according to claim 1 wherein the average particle size of said phosphor is between 0.5 and 5 μm.

8. Light source of claim 1 wherein the light source emits primary radiation and secondary radiation of said phosphor is emitted under excitation by the primary radiation.

9. Light source of claim 8 wherein the primary radiation is blue, preferably between 420 and 470 nm (peak wavelength), and combines with the secondary radiation and optionally with further secondary radiation of at least one further phosphor in order to obtain white light.

10. Light source according to claim 9 with a color rendition index Ra of at least 85, preferably 90.

* * * * *